United States Patent
Kinoshita

(10) Patent No.: US 9,113,072 B2
(45) Date of Patent: Aug. 18, 2015

(54) IMAGING CONTROL APPARATUS AND IMAGING APPARATUS CONTROL METHOD INCLUDING A FIRST DISPLAY MODE AND A SECOND DISPLAY MODE FOR EXECUTING AN IMAGE PREPARATION OPERATION BASED ON A TOUCH OPERATION

(71) Applicant: CANON KABUSHIKI KAISHA, Tokyo (JP)

(72) Inventor: Yuichi Kinoshita, Tama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/024,469

(22) Filed: Sep. 11, 2013

(65) Prior Publication Data
US 2014/0078371 A1    Mar. 20, 2014

(30) Foreign Application Priority Data

Sep. 14, 2012    (JP) ................................. 2012-203018

(51) Int. Cl.
*H04N 5/232* (2006.01)
*G06F 3/0488* (2013.01)

(52) U.S. Cl.
CPC .......... *H04N 5/23216* (2013.01); *G06F 3/0488* (2013.01); *H04N 5/23206* (2013.01); *H04N 5/23293* (2013.01)

(58) Field of Classification Search
CPC ....................... H04N 5/23216; H04N 5/23206
USPC ................... 348/21.4, 211.8, 211.13, 211.14, 348/333.07, 211.4
See application file for complete search history.

(56) References Cited

U.S. PATENT DOCUMENTS

| | | | | |
|---|---|---|---|---|
| 5,923,908 A | * | 7/1999 | Schrock et al. | 396/85 |
| 7,463,304 B2 | * | 12/2008 | Murray | 348/371 |
| 8,817,158 B2 | * | 8/2014 | Saito | 348/333.02 |
| 2006/0061663 A1 | * | 3/2006 | Park | 348/211.2 |
| 2007/0109417 A1 | * | 5/2007 | Hyttfors et al. | 348/211.99 |
| 2010/0166404 A1 | * | 7/2010 | Lombardi | 396/89 |
| 2010/0289910 A1 | * | 11/2010 | Kamshilin | 348/211.4 |
| 2011/0058052 A1 | * | 3/2011 | Bolton et al. | 348/211.99 |
| 2011/0206361 A1 | * | 8/2011 | Iwamoto | 396/263 |
| 2012/0014684 A1 | * | 1/2012 | D'Souza et al. | 396/263 |
| 2013/0215313 A1 | * | 8/2013 | Maeda | 348/333.02 |

FOREIGN PATENT DOCUMENTS

| | | | | |
|---|---|---|---|---|
| JP | 11160776 A | * | 6/1999 | |
| JP | 2001228523 A | * | 8/2001 | |
| JP | 2004078081 A | * | 3/2004 | |
| JP | 2011-193249 A | | 9/2011 | |

* cited by examiner

*Primary Examiner* — John Villecco
(74) *Attorney, Agent, or Firm* — Canon U.S.A., Inc. IP Division

(57) ABSTRACT

A display item (SW1 button 314) for instructing imaging preparation and a display item (SW2 button 313) for instructing imaging are individually displayed on a touch panel display 51. When the SW1 button 314 is touched by a touch operation by a photographer, an imaging apparatus 2 is controlled so as to perform an imaging preparation operation. When the SW2 button 313 is touched by a touch operation by the photographer, the imaging apparatus 2 is controlled so as to perform an imaging operation. Further, when the SW1 button 314 is slid so that the SW1 button 314 and the SW2 button 313 overlap, the imaging apparatus 2 is controlled so as to perform an imaging operation.

16 Claims, 8 Drawing Sheets

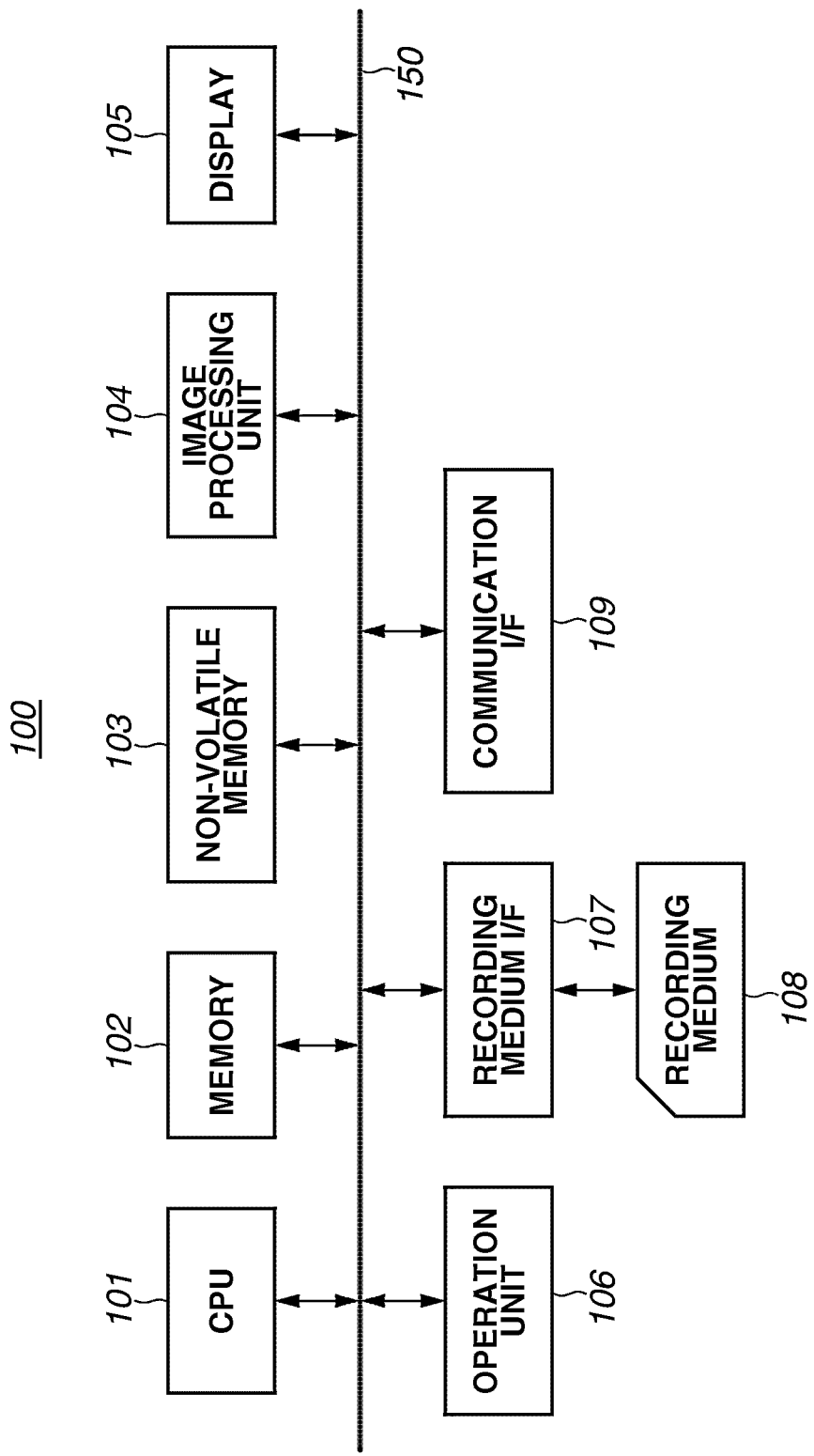

IMAGING CONTROL APPARATUS AND IMAGING APPARATUS CONTROL METHOD INCLUDING A FIRST DISPLAY MODE AND A SECOND DISPLAY MODE FOR EXECUTING AN IMAGE PREPARATION OPERATION BASED ON A TOUCH OPERATION

BACKGROUND OF THE INVENTION

1. Field of the Invention

The present invention relates to an imaging control apparatus and an imaging apparatus control method for capturing an image with an imaging unit based on an operation on an operation unit.

2. Description of the Related Art

Imaging can be performed using a remote imaging technique in which a live view display to be displayed on a display screen on a rear side of an imaging apparatus like a digital camera is enlarged and displayed on a display screen including a touch panel interface of a computer, and an image is captured by using remote imaging method that performs capturing by remote control. In remote imaging, in response to a touch operation made by a photographer on an imaging button or an imaging area displayed on the display screen, a release command from the computer is transmitted to the camera to perform capturing.

Conventionally, in an imaging apparatus generally called a camera, a press button type release switch is provided. This release switch has three states, a state in which the release switch is not pressed, a full press state in which the release switch is fully pressed so that the press button is pressed to the movable end, and a half press state between these two states. In a half press state of the release switch (hereinafter, "SW1"), an imaging preparation operation, such as autofocusing, automatic exposure control, and automatic white balance adjustment, is performed. Further, when the release switch is pressed to be in a full press state (hereinafter, "SW2"), an actual imaging operation is performed.

In addition, recently, in a digital camera capable of capturing while displaying and confirming an object on a liquid crystal panel screen, a touch panel display has been used for the liquid crystal display screen. In such a digital camera, the SW1 and SW2 operations on the touch panel can be realized by performing an imaging preparation operation with SW1 by making contact with the touch panel, and executing the imaging operation with SW2 in a state in which there is no longer contact on the touch panel.

SUMMARY OF THE INVENTION

The present invention is directed to an imaging control apparatus configured to control imaging of an image by an imaging unit, the imaging control apparatus including a display control unit configured to display a first display item and a second display item on a display screen of a display unit, a detection unit configured to detect a touch operation on the display screen, an imaging preparation control unit configured to, in response to detection of a touch on the first item, perform control to cause the imaging unit to execute an imaging preparation operation for adjusting a specific imaging setting relating to capturing, and an imaging control unit configured to, in response to detection of a touch on the second item, perform control to cause the imaging unit to execute an imaging operation for capturing an image and recording the captured image.

Further features and aspects of the present invention will become apparent from the following description of exemplary embodiments with reference to the attached drawings.

BRIEF DESCRIPTION OF THE DRAWINGS

FIG. 3 is a block configuration diagram illustrating a configuration of a display control apparatus 100 according to the present invention.

DESCRIPTION OF THE EMBODIMENTS

Various exemplary embodiments, features, and aspects of the invention will be described in detail below with reference to the drawings.

Figure 1:
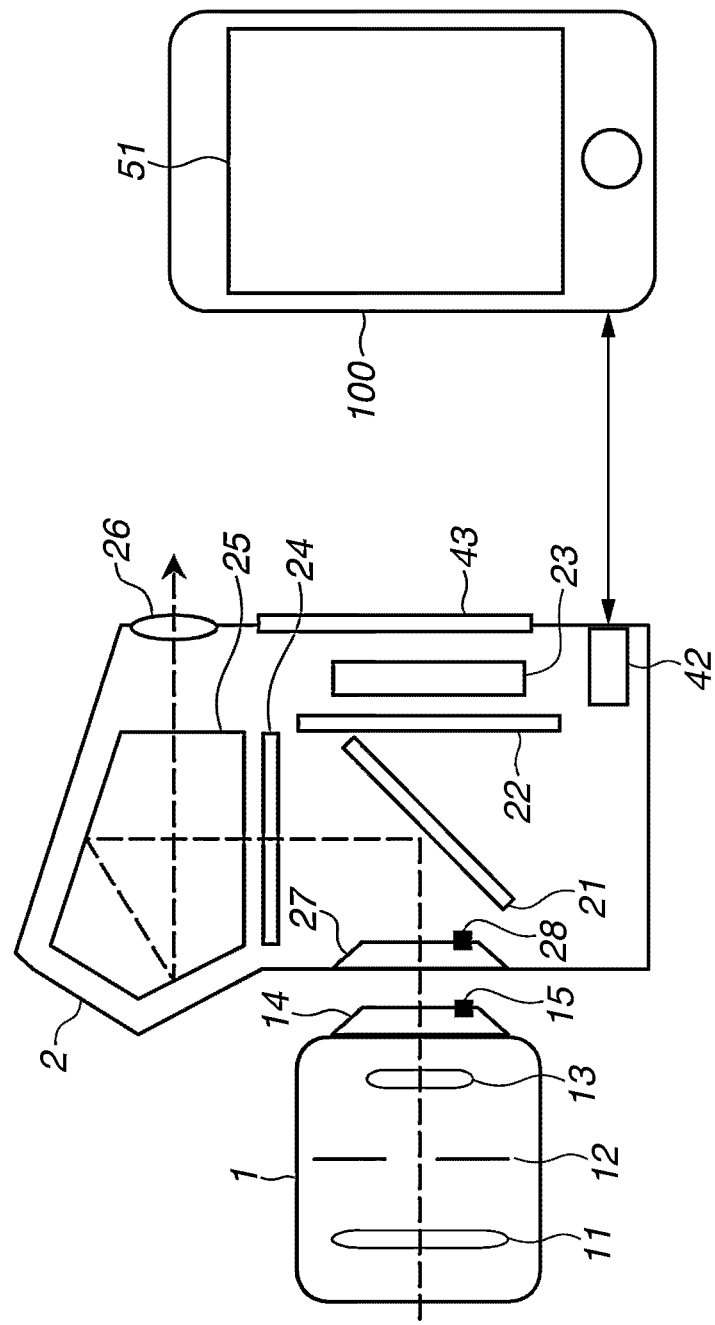
FIG. 1 is a system configuration diagram illustrating an exemplary embodiment of an imaging apparatus 2 according to the present invention.

FIG. 1 is a remote imaging system configuration diagram according to an exemplary embodiment of the present invention.

A first exemplary embodiment will now be described.

A first exemplary embodiment illustrating an embodiment of the present invention will be described below.

FIG. 1 illustrates a schematic diagram of an interchangeable-lens type imaging apparatus 2.

An interchangeable lens 1 generally includes a zoom lens 11 for varying focal length, a diaphragm mechanism 12 for controlling brightness, and a focus lens 13 for focusing on an object. Further, the interchangeable lens 1 is configured so that a mounting section 14 on the lens side can be mechanically attached to a mount section 27 of the imaging apparatus 2. The imaging apparatus 2 reflects light that has passed through the lens with a half-mirror 21, and focuses the light at a position on a focusing screen 24. The light focused on the focusing screen 24 is reflected by a prism 25, and passes through an eyepiece lens 26. The light can then be measured as an erected image.

Further, during capturing, the half-mirror 21 flips up, a shutter 22 opens, and light that has passed through the lens 1 forms an image on an image sensor 23.

A group of contacts 15 is included in the mounting section 14 of the interchangeable lens 1. This group of contacts 15 is a contact (not illustrated) for supplying power from the imaging apparatus 2 to perform communication. The group of contacts 15 is divided into respective intended use, such as power source, ground, transmission, reception, and clock.

The mounting section 14 on the interchangeable lens 1 attaches to the mount section 27 of the imaging apparatus 2 so that each connection terminal in a group of contacts 28 in the mount section 27 is connected to each connection terminal in the group of contacts 15 in the mounting section 14.

Consequently, power is supplied to the interchangeable lens 1 from the imaging apparatus 2 via the contact terminals, and communication starts between the interchangeable lens 1 and the imaging apparatus 2.

Further, in FIG. 1, the imaging apparatus 2 and the display control apparatus 100 are connected via a communication interface 42.

Figure 2:
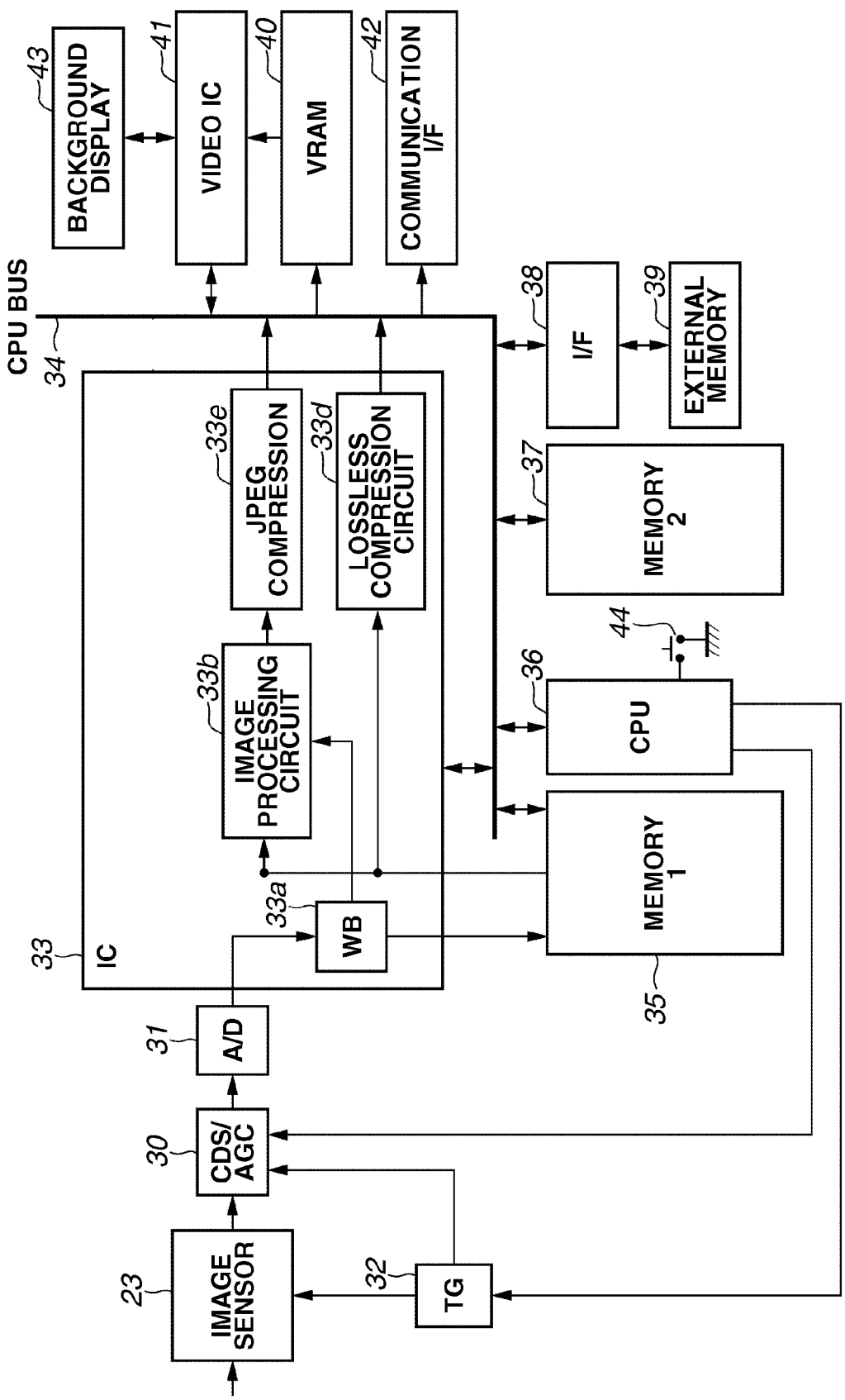
FIG. 2 is a block configuration diagram illustrating a configuration of an imaging apparatus 2 according to the present invention.

Next, an internal block configuration of the imaging apparatus 2 will be described with reference to FIG. 2.

The image sensor 23 is a sensor such as a charge-coupled device (CCD) or a complementary metal oxide semiconductor (CMOS). Light that has been focused on the image sensor 23 via the lens 1 is converted into an electric charge with an amount according to the amount of incident light by each pixel in the image sensor 23. A signal generated by a timing generator 32 drives the image sensor 23 so that electric charges accumulated in the sensor are transferred and successively converted into voltage signals. The converted voltage signals are sampled with a correlated double sampling (CDS) 30, and are converted into digital signals by an analog/digital (A/D) converter 31. The image data converted into digital signals is input to an integrated circuit (IC) 33. First, the data is input into a white balance (WB) circuit 33a for calculating a parameter for white balance, temporarily stored in a first memory 35, and then subjected to data processing as necessary.

During a live view display, the half-mirror 21 flips up, the shutter 22 opens, and light that has passed through the lens 1 forms an image on an image sensor 23. The captured image data is stored in a second memory 37. A live view image is written into a video random-access memory (VRAM) 40, and a live view display is performed on a rear display 43 arranged on the imaging apparatus 2 by a video IC 41 for display control. The live view display is updated at periodic intervals with a captured image, which substitutes for confirmation of the imaging target performed via an optical finder. The user can perform capturing by confirming this live view on the rear face display 43, and operating a release button 44 at a predetermined timing.

The release button 44, which is a release switch, is connected to a central processing unit (CPU) 36. The release switch has three states, a state in which the release switch is not pressed, a full press state (SW2) in which the release switch is pressed to the movable end, and a half press state (SW1) between the other two states. When the release switch is in the SW1 state, a command to start imaging preparation processing, namely, an imaging preparation command, is output from the CPU 36, and an imaging preparation operation is executed, such as adjustment of an imaging setting, including autofocusing, automatic exposure control, and automatic white balance. Specifically, a parameter for adjusting white balance is calculated by the WB circuit 33a, and calculations and imaging preparation operations are performed by the CPU 36 or the IC 33 for performing autofocus and automatic exposure. Then, based on the calculation result, imaging preparation processes such as autofocus and automatic exposure are executed by processing the data with an image processing circuit 33b and adjusting the lens 1.

After the imaging preparation operations have been performed with SW1, when the release switch is pressed further to the SW2 state, the CPU 36 outputs a command to start an imaging operation, and performs imaging control. The below-described imaging operation is executed, and an image is written into an external memory 39. If a continuous shooting mode is set, and if the release switch is in the SW2 state, the imaging operation is repeated until the release switch becomes a state in which the release switch is not pressed or in the SW1 state. Specifically, as long as the SW2 state of the release switch continues, continuous shooting is performed, and a plurality of images is captured in succession. When the release switch changes to some other state than SW2, namely, SW1 or a state being not pressed, the CPU 36 outputs a command to stop imaging, and the continuous shooting operation finishes.

During the imaging operation, the data stored in the first memory 35 is re-input into the IC 33, and subjected to the following three image processing processes. First, the image data converted into a digital signal is converted into RAW data obtained by subjecting the data to lossless compression by a lossless compression circuit 33d that applies lossless compression, and the converted RAW data is transmitted to a CPU bus 34. Further, the image data converted into a digital signal is transmitted to the CPU bus 34. Lastly, the image data is subjected to image processing by the image processing circuit 33b to create an image for Joint Photographic Experts Group (JPEG) compression. The YcbCr that is consequently output is converted into raster blocks, subjected to JPEG compression by a JPEG compression circuit 33e, and transmitted to the CPU bus 34. The CPU 36 temporarily stores the image data output to the CPU bus 34, which is the captured image data, in the first memory 35, and ultimately writes the image data in the external memory 39 via an interface circuit 38.

Immediately after the power has been turned on, the CPU 36 initializes the imaging apparatus 2 based on a program in the memory 37, and performs communication with the interchangeable lens 1. The CPU 36 controls each block in the imaging apparatus 2 based on a program read from the second memory 37, and executes the respective processes. The flowcharts described below are similarly executed by the CPU 36 controlling the operation of each block based on a read program.

In FIG. 1, the imaging apparatus 2 and the display control apparatus 100 are connected via the communication interface 42. The transmission and reception of various kinds of data, such as image data, and commands (command signals) is performed via the communication interface 42. The imaging apparatus 2 not only executes an imaging operation according to a command output from the CPU 36 according to the SW2 to start an imaging operation, but also executes an imaging operation in response to a command to start an imaging operation received from the display control apparatus 100 via the communication interface 42. Similarly, the imaging preparation operation is also executed based on the reception of a command to start an imaging preparation operation from the display control apparatus 100. Based on such a configuration, remote imaging for performing an imaging instruction can also be performed from an external apparatus other than the imaging apparatus 2. Further, when performing remote imaging using an external display control apparatus, it may be constituted such that a live view image may be periodically transmitted to the display control apparatus via the communication I/F 42 so that the imaging operation can be performed while confirming the live view image on the display control apparatus 100 side.

FIG. 3 illustrates an example of the configuration of the display control apparatus 100 capable of applying the present invention. The display control apparatus 100 is configured from, for example, a personal computer or a smartphone (hereinafter, "PC").

In FIG. 3, a CPU 101, a memory 102, a non-volatile memory 103, an image processing unit 104, a display 105, an operation unit 106, a recording medium I/F 107, and a communication I/F 109 are connected to an internal bus 150. The various units connected to the internal bus 150 are configured so that they can exchange data with each other via the internal bus 150.

The memory 102 is configured from, for example, a RAM (a volatile memory that utilizes a semiconductor element etc.). The CPU 101 controls the various units in the display control apparatus 100 using the memory 102 as a work memory based on a program stored in the non-volatile memory 103, for example. The below-described processing is realized by the CPU 101 controlling the various units based on a program read from the non-volatile memory 103. The non-volatile memory 103 stores image data, audio data, other data, various kinds of program operating the CPU 101 and the like. The non-volatile memory 103 is configured from, for example, a hard disk (HDD) or a read-only memory (ROM).

Under the control of the CPU 101, the image processing unit 104 performs various kinds of image processing on image data stored in the non-volatile memory 103 or a recording medium 108 and image data obtained via a communication I/F 109. Examples of the image processing performed by the image processing unit 104 include A/D conversion processing, D/A conversion processing, image data encoding processing, compression processing, decoding processing, enlarging/reduction (resizing) processing, noise reduction processing, and color conversion processing. The image processing unit 104 may be configured from dedicated circuit blocks for performing specific image processing. Some types of image processing can be performed by the CPU 101 based on a program rather than by the image processing unit 104.

The display 105 displays an image and a graphical user interface (GUI) screen forming a GUI under the control of the CPU 101. The CPU 101 generates a display control signal based on a program, and controls each unit in the display control apparatus 100 so that a video signal to be displayed on the display 105 is generated and output to the display 105. The display 105 displays a video image based on the output video signal. The display control apparatus 100 may include up to an interface for outputting a video signal to be displayed on the display 105. In this case, the display 105 may be configured with an external monitor (television etc.).

The operation unit 106 is an input device for receiving user operations including character information input device, such as a keyboard, a pointing device such as a mouse or a touch panel, or a button, a dial, a joystick, a touch sensor, or a touch pad. In the present exemplary embodiment, a touch panel is flatly overlaid on the display 105, and coordinate information corresponding to a position being contact with on the display screen of the display 105 is output from the touch panel.

The recording medium I/F 107, into which the recording medium 108 such as a memory card, a compact disc (CD), or a digital versatile disc (DVD) can be mounted, reads data from the mounted recording medium 108 or writes data onto the recording medium 108 under the control of the CPU 101. The communication I/F 109 is an interface connected to an external device or the Internet via a wired cable or wirelessly for transmitting and receiving various kinds of data such as image data, audio data, files, and commands. In the present exemplary embodiment, image data such as a live view image is received from the connected imaging apparatus 2 via the communication I/F 109, and commands such as an imaging start command, an imaging preparation start command, and an imaging stop command are transmitted to the imaging apparatus 2.

The CPU 101 can detect the following operations on the touch panel configuring the operation unit 106: that the touch panel has been touched by a finger or a pen (hereinafter, "touch-down"); that the touch panel is being touched by a finger or a pen (hereinafter, "touch-on"); that a finger or a pen is moving while still in touch with the touch panel (hereinafter, "move"); that the finger or the pen that was touching the touch panel has been released (hereinafter, "touch-up"); and that nothing is touching the touch panel (hereinafter, "touch-off").

These operations and the position coordinates where the finger or the pen is touching the touch panel are notified to the CPU 101 via the internal bus 150. The CPU 101 determines what kind of operation has been performed on the touch panel based on the notified information. Regarding the move operation, the movement direction of the finger or the pen on the touch panel can also be determined for both the vertical component and the horizontal component on the touch panel based on changes in the position coordinates. Further, when a touch-up is made following a predetermined move after a touch-down performed on the touch panel, it is determined that a stroke have been drawn. An operation in which a stroke is rapidly drawn is called a flick. A flick is an operation in which a finger is rapidly moved a certain distance while still touching the touch panel, and then released. In other words, a flick is an operation in which the finger rapidly traces over the touch panel so as to bounce off it.

When a move is detected as having been performed for a predetermined distance or more at a predetermined speed or greater, and a touch-up is detected immediately thereafter, a flick is determined as having been performed. Further, when a move is detected based on an operation being performed for a predetermined distance or more at less than a predetermined speed, it is determined that a drag has been performed. Various touch panels may be used for the touch panel, including a resistance film type, a capacitance type, a surface acoustic wave type, an infrared ray type, an electromagnetic induction type, an image recognition type, a light sensor type and the like.

Next, a method for remote imaging control in a remote imaging system in which the display control apparatus 100 and the imaging apparatus 2 illustrated in FIG. 1 via the external interface 38 according to the present invention will be described with reference to FIGS. 4 to 6.

The display of the live view display screen is displayed on a touch panel display 51, which is the display 105 in the display control apparatus 100. As described above, a periodically-captured live view is obtained from the imaging apparatus 2, and the received image is displayed on the touch panel display 51.

Figure 4A:
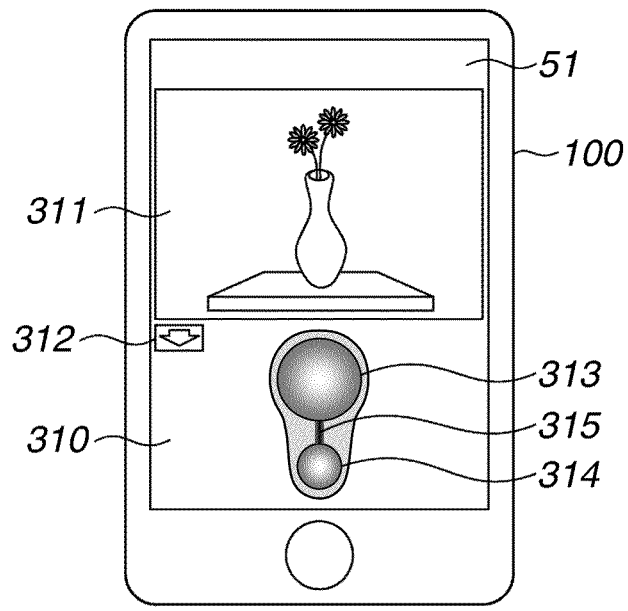
FIGS. 4A and 4B illustrate display examples in a display control apparatus 100.

FIG. 4A is a display example of an operation/display screen 310 of the touch panel display 51 in the display control apparatus 100 during remote imaging. When the imaging apparatus 2 connected to the display control apparatus 100 starts a live view, the live view image is transmitted from the imaging apparatus 2 to the display control apparatus 100. The live view image obtained from the imaging apparatus 2 is displayed on a live view display screen 311 arranged on the operation/display screen 310 (remote live view). The display on the operation/display screen 310 is realized by the CPU 101 performing display control based on the live view image received via the communication I/F 109 and data stored in the non-volatile memory 103.

An operation icon 313 (hereinafter, "SW2 button 313") for instructing SW2 and an operation icon 314 (hereinafter, "SW1 button 314") for instructing SW1 are respectively displayed on the operation/display screen 310 as operation units for issuing an imaging command. The SW1 button 314 and the SW2 button 313 are configured so that when the photographer makes a touch within an icon display area, the display of the button changes so it looks as though it has been pressed, which enables the photographer to recognize that the button has been pressed in the same manner as a mechanical button.

Further, the arrangement position of the SW1 button 314 and the SW2 button 313 is such that they fit within the movable range of a person's thumb so that a SW1 operation and a SW2 operation can be performed with one hand. Further, although the SW1 button 314 is arranged at a position away from the SW2 button 313, the SW1 button 314 is configured so that it can be slid toward the SW2 button 313 side. As illustrated in FIG. 4A, it is desirable to clearly indicate that the SW1 button 314 can be slid by displaying a guide line 315 indicating the slide direction of the SW1 button 314.

Figure 4B:
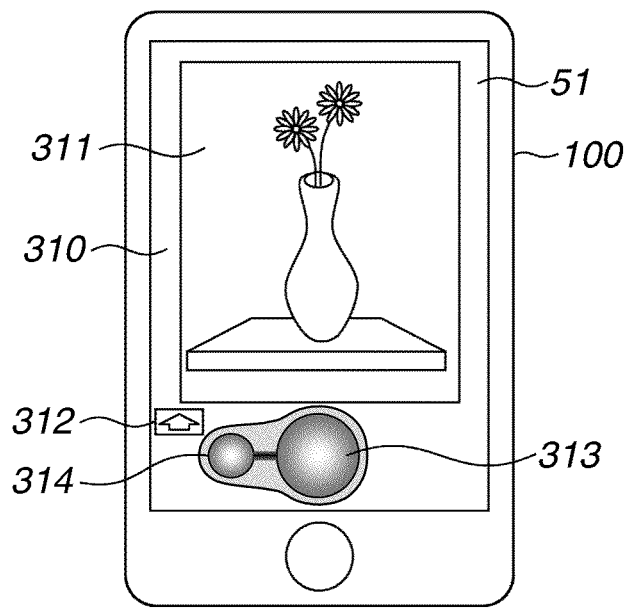

An operation icon 312 (hereinafter, "enlargement/reduction button 312") is an operation member for switching the display area of the live view display screen 311 between an enlarged and a reduced display. In the display state of the live view display screen 311 illustrated in FIG. 4A, when the enlargement/reduction button 312 is operated, an enlarged display of the live view screen like that illustrated in FIG. 4B is displayed. Due to the enlargement of the live view screen, the arrangement of the SW2 button 313 and the SW1 button 314 changes. Namely, although in FIG. 4A the SW2 button and the SW1 button are arranged in the vertical direction of the diagram, and SW1 can be slid in the vertical direction, in FIG. 4B the SW2 button and the SW1 button are arranged in the horizontal direction of the diagram, and SW1 can be slid in the horizontal direction.

This is because if the live view display screen 311, the SW2 button 313, and the SW1 button 314 are arranged in the same direction (the vertical direction in the diagram), the display area of the SW2 button 313 and the SW1 button 314 is narrowed by the enlargement of the live view display screen 311 in the vertical direction in which the SW2 button 313 and the SW1 button 314 are arranged. Accordingly, by rotating the SW2 button 313 and the SW1 button 314 90° to change to a horizontal direction arrangement, the area in the vertical direction that is required to display the SW2 button 313 and the SW1 button 314 is decreased. Consequently, the live view display screen 311 can be sufficiently enlarged without the SW2 button 313 and the SW1 button 314 overlapping the live view display screen 311. Further, when the live view display screen 311, the SW2 button 313, and the SW1 button 314 are arranged in the horizontal direction, when the live view display screen 311 is enlarged in the horizontal direction, the SW2 button 313 and the SW1 button 314 may be rotated 90° in the same way.

When the display control apparatus 100 (CPU 101) detects that the position of the SW2 button 313 has been touched (being in contact with) by the photographer, the display control apparatus 100 transmits an imaging start command to the imaging apparatus 2. Then, when the display control apparatus 100 detects that the touch has been released from the SW2 button 313, the display control apparatus 100 transmits an imaging stop command to the imaging apparatus 2. Further, when the display control apparatus 100 (CPU 101) detects that the SW1 button 314 has been touched, the display control apparatus 100 transmits an imaging preparation start command to the imaging apparatus 2. When the display control apparatus 100 detects that the touch has been released from the SW1 button 314, the display control apparatus 100 transmits an imaging preparation stop command to the imaging apparatus 2.

In addition, after the SW1 button 314 has been touched, the SW1 button 314 can be slid in the direction of the SW2 button 313. Accordingly, after the SW1 button 314 has been touched, the display position of the SW1 button 314 is changed according to the touched position by detecting the movement of the touch position. If the display position of the SW1 button 314 is touched, but the subsequent movement of the touch position is in a different direction to the direction in which the SW1 button 314 is capable of sliding, the CPU 101 determines that the touch on the SW1 button 314 has been released. If it is detected that the position of the SW1 button 314 has been moved by a touch operation by the photographer, so that the SW1 button 314 has overlapped the SW2 button 313, the CPU 101 transmits an imaging start command to the imaging apparatus 2.

Figure 5A:
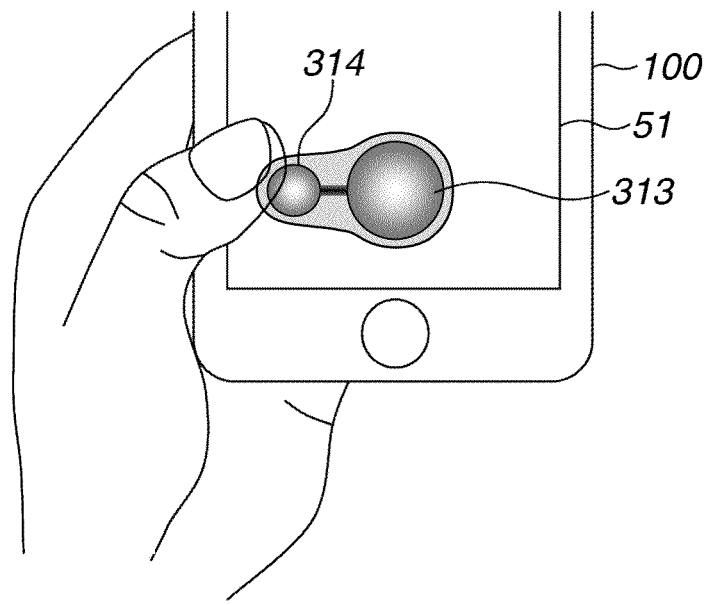
FIGS. 5A, 5B, and 5C illustrate display examples in a display control apparatus 100.

Thus, the series of operations for issuing the imaging command by sliding the SW1 button 314 toward the SW2 button 313 assumes that the display control apparatus 100 is held in one hand, as illustrated in FIG. 5A. Further, it is also assumed that an imaging preparation command is issued by touching the SW1 button 314 with the thumb, and that when imaging preparation is ready, the imaging command is issued by, maintaining the touch on the SW1 button 314 and sliding the thumb toward the SW2 button 313 so that the SW1 button 314 overlaps the SW2 button 313.

When realizing the SW1 state at the start of contact on the touch panel and the full press SW2 state in a state in which contact has been released from the touch panel, it is difficult to issue only an imaging preparation operation instruction by only performing a SW1 operation. Further, it is also difficult to operate only the SW2 or to realize only an imaging command such as continuous shooting or bulb shooting while maintaining the SW2 state.

Accordingly, based on the above configuration, when issuing an imaging preparation instruction and an imaging instruction by a touch operation, the imaging preparation instruction and the imaging instruction can be issued individually. Further, even when issuing both instructions in succession, camera shake does not easily occur, and operability can be improved.

Although in the present exemplary embodiment operation with one hand is described, since the SW1 button 314 and the SW2 button 313 have independent functions, the imaging preparation operation and the imaging operation can also be performed by an operation using both hands or using two fingers.

Figure 6:
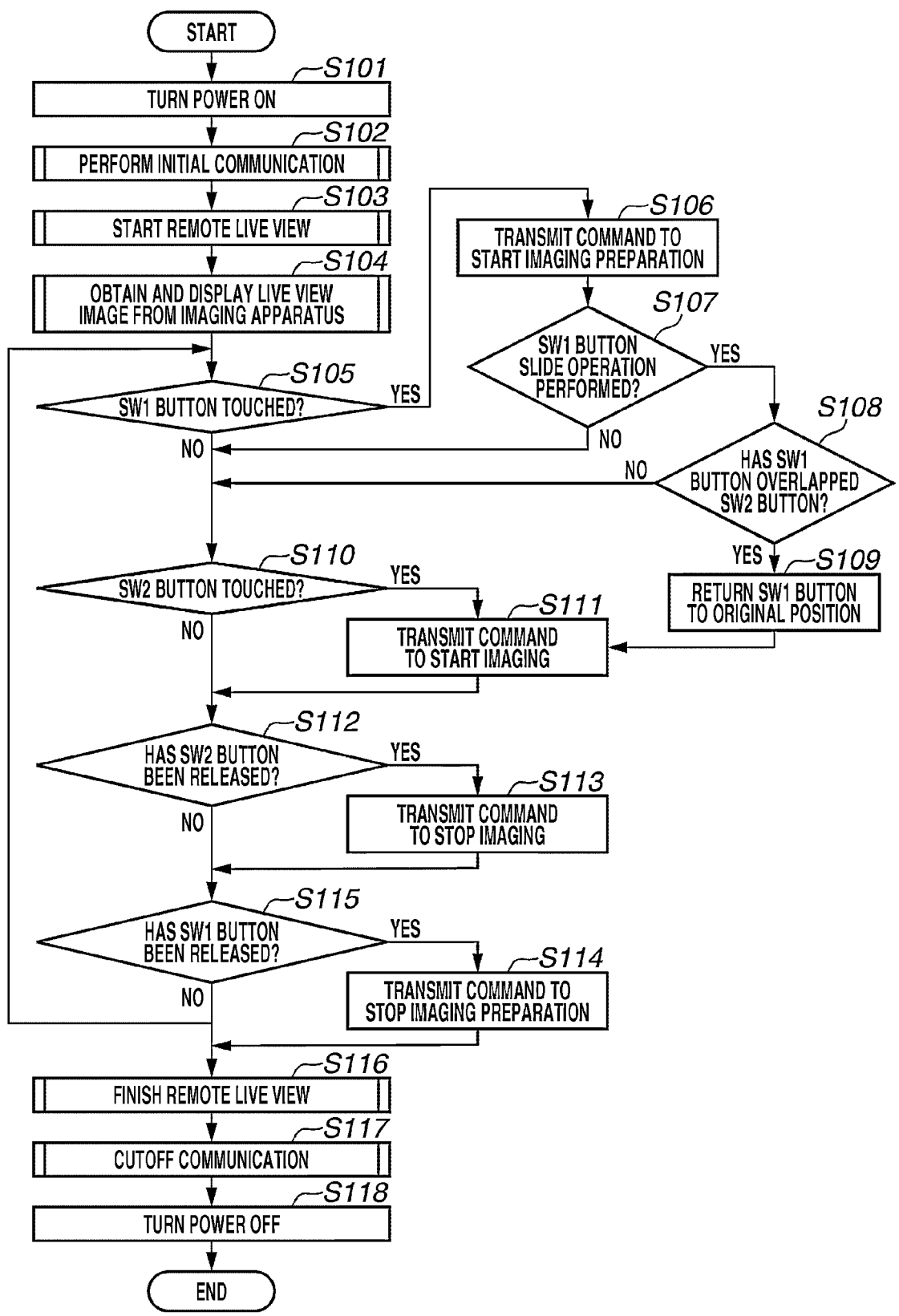
FIG. 6 is a flowchart illustrating a control procedure of remote imaging according to a first exemplary embodiment.

FIG. 6 is a flowchart illustrating release control performed by the display control apparatus 100 in the remote imaging according to the present exemplary embodiment. This processing is realized by the CPU 101 controlling and performing the calculations and data processing of each unit illustrated in FIG. 3 based on a program read from the non-volatile memory 103.

The display control apparatus 100 is connected to the imaging apparatus 2 via the communication I/F 109. The display control apparatus 100 can obtain information about the imaging settings in the imaging apparatus 2 and the current state of the imaging apparatus 2 by communicating with the imaging apparatus 2 via the communication interface 42.

In step S101, a power button (not illustrated) of the display control apparatus 100 is operated to turn the power ON, so that electricity is supplied to each of the units in the display control apparatus 100, allowing the display control apparatus 100 to operate.

In step S102, the display control apparatus 100 starts communication with the imaging apparatus 2 that is connected via the communication I/F 109, and information about each apparatus is exchanged. Especially in remote imaging, an imaging instruction is issued from the display control apparatus side, in step S102, the display control apparatus 100 receives current setting information from the imaging apparatus 2. Here, the setting information is, for example, imaging setting information about the imaging mode setting status and the white balance, and information about the live view state. If the imaging apparatus 2 setting information has been changed by the photographer operating the imaging apparatus 2, or if the imaging apparatus 2 setting information has been changed by operating the display control apparatus 100, an update is notified from the imaging apparatus 2 to the display control apparatus 100.

In step S103, the display control apparatus 100 notifies the imaging apparatus 2 of the start of the remote live view, and the imaging apparatus 2 starts the live view. When the start of the remote live view is notified to the imaging apparatus 2, a live view image is periodically transmitted from the imaging apparatus 2 to the display control apparatus 100.

In step S104, the display control apparatus 100 displays the live view image obtained from the imaging apparatus 2 on the live view display screen 311 of the touch panel display 51, and updates the live view display according to the periodically-received live view image.

In step S105, the CPU 101 of the display control apparatus 100 determines whether the SW1 button 314 displayed on the touch panel display 51 has been touched. If it is determined that the SW1 button 314 has been touched (YES in step S105), the processing proceeds to step S106. If it is determined that the SW1 button 314 has not been touched (NO in step S105), the processing proceeds to step S110.

If it is determined in step S105 that the SW1 button 314 has been touched, to make the imaging apparatus 2 execute the imaging preparation processing, in step S106, an imaging preparation start command is transmitted via the communication I/F 109 to the imaging apparatus 2, and the imaging apparatus 2 is made to execute imaging preparation. Then, in step S107, the CPU 101 determines whether a touch operation has been made in which the SW1 button 314 has been slid by moving the touch position of the SW1 button 314 while maintaining the touch thereon. If it is determined that a SW1 slide operation has been made (YES in step S107), the processing proceeds to step S108. In step S108, a determination is made whether the SW1 button has been slid to a position that overlaps the SW2 button. If it is determined in step S107 that a slide operation has not been performed (NO in step S107), or if it is determined in step S108 that the SW1 button 314 does not overlap the SW2 button 313 (NO in step S108), the processing proceeds to step S310.

If it is determined in step S108 that the SW1 button 314 overlaps the SW2 button 313 (YES in step S108), in step S109, the CPU 101 returns the SW1 button 314 that has been slid to a position overlapping the SW2 button back to its original display position. Then, in step S111, the CPU 101 transmits an imaging start command to the imaging apparatus 2. Specifically, when the photographer touches the SW1 button and then slides SW1 so as to overlap SW2, an imaging operation is executed by the imaging apparatus 2.

In step S108, the method for determining whether SW1 has been slid to a position where the SW1 button and the SW2 button overlap can be performed by comparing the display position of the SW1 button and the display position of the SW2 button. Alternatively, the determination whether the SW1 button and the SW2 button overlap can be performed by comparing the touch position detected in order to slide the SW1 button and a predetermined display position of SW2. Further, the touch position where the SW1 button and the SW2 button overlap when the SW1 button is slid, the touch position may be determined in advance and stored in the non-volatile memory 103, and a determination made that the SW1 button and the SW2 button overlap if a detected touch position matches the predetermined position. In this case, the touch coordinates for a case of overlap may be recorded as a threshold. If the touch coordinates detected when the SW1 slide operation is performed exceed the threshold, a determination may be made that the SW1 button and the SW2 button overlap, and an imaging start command is transmitted.

The SW1 button and the SW2 button may be defined as overlapping when, for example, a part of a display area of the buttons overlaps. Further, rather than the button display per se overlapping, a state in which an area defined by the CPU 101 as a button display area is included within an area defined as the display area of the other button, namely, a state in which the SW1 button is included within the SW2 button, or the SW2 button is included within the SW1 button, may also be defined as the SW1 button and the SW2 button overlapping.

In step S110, the CPU 101 determines whether the SW2 button 313 displayed on the touch panel display 51 has been touched. If it is determined in step S110 that the SW2 button 313 has been touched (YES in step S110), in step S111, the CPU 101 transmits an imaging start command to the imaging apparatus 2 via the communication I/F 109. Then, in step S112, the CPU 101 determines whether the touch on the SW2 button 313 has been released. If it is determined that the touch has been released (YES in step S112), in step S113, the CPU 101 transmits an imaging stop command to the imaging apparatus 2. Specifically, during the period that the SW2 button is being touched, an imaging operation is continuously performed by the imaging apparatus 2.

In step S115, the CPU 101 determines whether the touch on the SW1 button 314 displayed on the touch panel display 51 has been released. If it is determined that the touch on the SW1 button has been released (YES in step S115), in step S114, the CPU 101 transmits an imaging preparation stop command to the imaging apparatus 2. Specifically, the imaging preparation operation by the imaging apparatus 2 is stopped based on the touch on the SW1 button being released.

During remote imaging, the processing from step S106 to step S115 is repeated.

In step S116, the CPU 101 closes an operation/display screen 301, notifies the imaging apparatus 2 of completion of the live view, and ends the remote live view.

In step S117, communication is cutoff, and then in step S118, the power is turned off to end process.

Thus, according to the present exemplary embodiment, by individually providing and displaying the SW1 button and the SW2 button, the imaging preparation operation instruction and the imaging operation instruction can be individually performed. Further, since an imaging operation instruction can be issued by sliding the SW1 button so as to overlap the SW2 button, camera shake does not easily occur, and the instruction for the imaging operation from the imaging preparation operation can be made based on an operation with good operability.

Further, in the present exemplary embodiment, when the SW1 button and the SW2 button overlap, in step S109, the SW1 button 314 is returned to its original display position, and only one image is captured. However, the processing may also be performed so that continuous shooting is performed by continuing the imaging operation by the imaging apparatus 2 during the period that it is determined that the SW1 button is overlapping the SW2 button, without returning the SW1 button 314 to its original display position as in step S109. In this case, in response to detection of the fact that the SW1 button is no longer overlapping the SW2 button, an imaging stop command is transmitted to the imaging apparatus 2, and an instruction to stop the continuous shooting is notified.

A second exemplary embodiment will now be described.

Next, a second exemplary embodiment of remote imaging according to the present invention will be described. The present exemplary embodiment has the same system configuration and apparatus configuration as the first exemplary embodiment. Further, a detailed description of processing that is the same as that described in the first exemplary embodiment will be omitted.

In the first exemplary embodiment, as a control method of the SW2 button 313, an imaging command to the imaging apparatus 2 is maintained only during the period that the photographer maintains his/her operation of the SW2 button 313. In the second exemplary embodiment, a lock mechanism is provided for holding a pressed state of the SW2 button 313. When holding a release for an extended period, such as in bulb imaging, imaging can be continued even if the photographer does not maintain an operation state for an extended period.

Figure 5B:
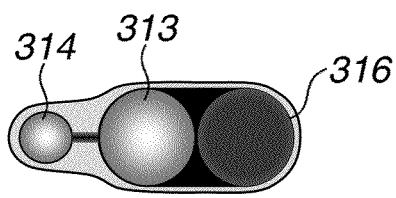
Figure 5C:
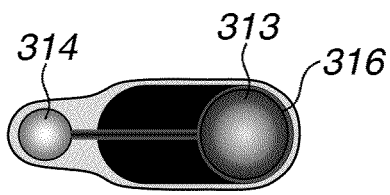

FIG. 5B is a configuration example of a remote release associated member according to the second exemplary embodiment. An area for locking the SW2 button 313 and holding that state (hereinafter, "lock area") represents a display mode that enables the photographer to identify a state held area like that illustrated in FIG. 5B. The photographer can slide the SW2 button 313 to a lock area 316. When the SW2 button 313 overlaps the lock area 316, the SW2 button 313 changes to a pressed state (a locked state) like that illustrated in FIG. 5C, and that state is subsequently held. Further, even if the photographer releases his/her finger from the SW2 button 313, an imaging stop command is not transmitted to the imaging apparatus 2, and the imaging command is maintained. With the SW2 button 313 in a locked state, when the photographer performs a release operation, such as pressing the SW2 button 313, an imaging stop command is transmitted to the imaging apparatus 2, and imaging is stopped.

Figure 7:
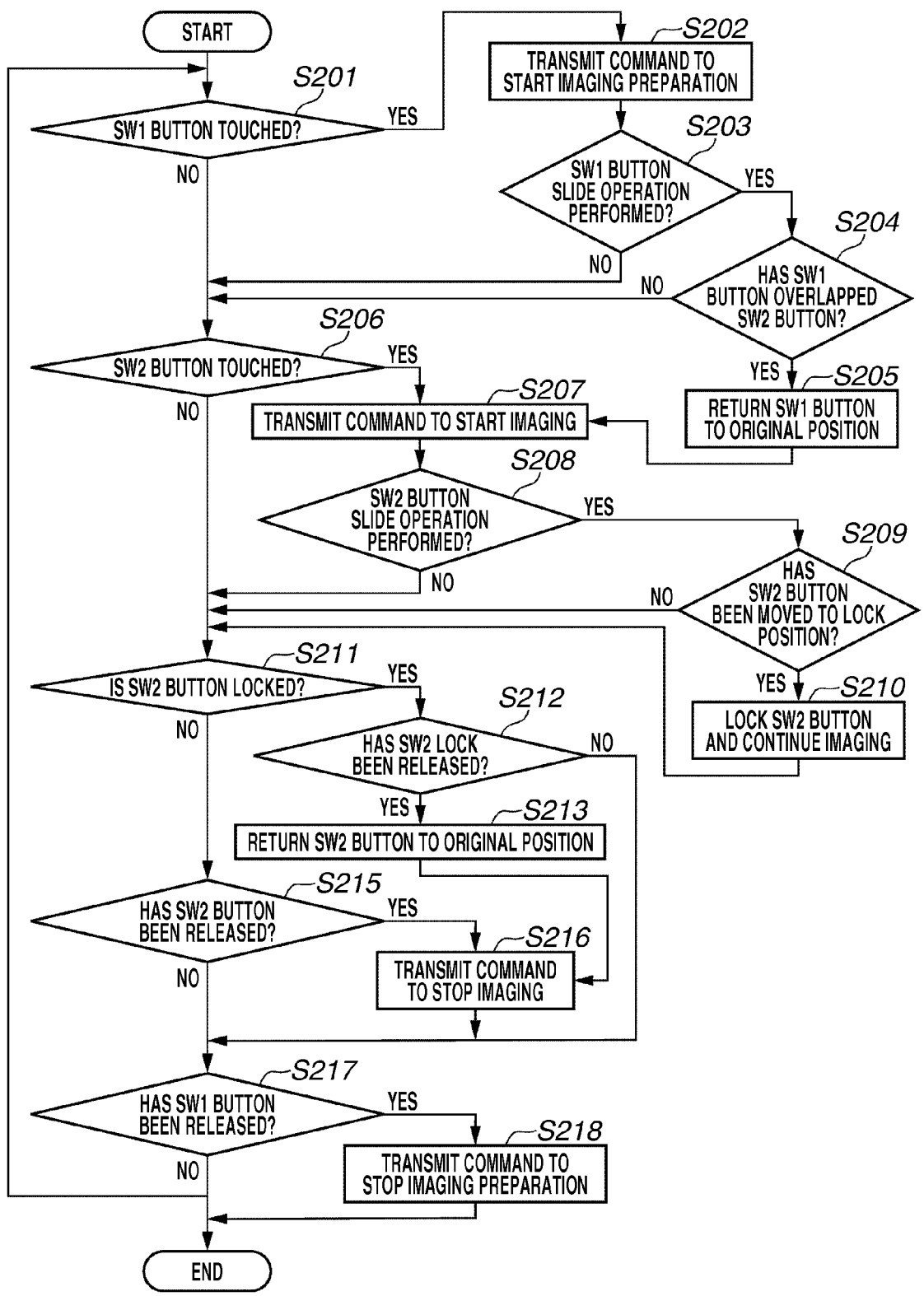
FIG. 7 is a flowchart illustrating a control procedure of remote imaging according to a second exemplary embodiment.

FIG. 7 is a flowchart illustrating remote release control according to the present exemplary embodiment. FIG. 7 only illustrates the portions different from the flowchart illustrated in the first exemplary embodiment (portions corresponding to steps S105 to S115 of FIG. 6).

In step S201, the CPU 101 determines whether the SW1 button 314 has been touched. If it is determined that the SW1 button 314 has been touched (YES in step S201), the processing proceeds to step S202. If it is determined that the SW1 button 314 has not been touched (NO in step S201), the processing proceeds to step S206. In step S202, the CPU 101 transmits an imaging preparation start command to the imaging apparatus 2, and the processing proceeds to step S203.

In step S203, the CPU 101 determines whether a SW1 button 314 slide operation has been performed. If it is determined that a slide operation has been performed (YES in step S203), the processing proceeds to step S204. If it is determined that a slide operation has not been performed (NO in step S203), the processing proceeds to step S206.

In step S204, the CPU 101 determines whether the SW1 button 314 has overlapped the SW2 button 313. If it is determined that the slid SW1 button 314 has not overlapped the SW2 button 313 (NO in step S204), the processing proceeds to step S206. If it is determined that the slid SW1 button 314 has overlapped the SW2 button 313 (YES in step S204), the processing proceeds to step S205. In step S205, the CPU 101 returns the slid SW1 button 314 to its original display position, and the processing proceeds to step S207.

In step S206, the CPU 101 determines whether the SW2 button 313 has been touched. If it is determined that the SW2 button 313 has been touched (YES in step S206), the processing proceeds to step S207. If it is determined that the SW2 button 313 has not been touched (NO in step S206), the processing proceeds to step S211.

In step S207, the CPU 101 transmits an imaging start command to the imaging apparatus 2, and the processing then proceeds to step S208.

In step S208, the CPU 101 determines whether a SW2 button 313 slide operation has been performed. If it is determined that a slide operation has been performed (YES in step S208), the processing proceeds to step S209. If it is determined that a slide operation has not been performed (NO in step S208), the processing proceeds to step S211.

In step S209, the CPU 101 determines whether the slid SW2 button 313 has overlapped the lock area 316. If it is determined that the SW2 button 313 has not overlapped the lock area 316 (NO in step S209), the processing proceeds to step S211. If it is determined that the SW2 button 313 has overlapped the lock area 316 (YES in step S209), the processing proceeds to step S210.

In step S210, the CPU 101 locks the slid SW2 button 313 and maintains imaging. Then, the processing proceeds to step S211.

In step S211, the CPU 101 determines whether the SW2 button 313 is locked. If it is determined that the SW2 button 313 is locked (YES in step S211), the processing proceeds to step S212. If it is determined that the SW2 button 313 is not locked (NO in step S211), the processing proceeds to step S215.

In step S212, the CPU 101 determines whether an operation for releasing the lock of the SW2 button 313 has been performed based on whether the SW2 button is not at the lock position, whether the SW2 button has been moved by a slide operation to its original position, or whether the SW2 button has been touched again after being released once. If it is determined that the lock has been released (YES in step S212), the processing proceeds to step S213. If it is determined that the lock has not been released (NO in step S212), the processing proceeds to step S217.

In step S213, the CPU 101 returns and displays the SW2 button 313 at its original position, and the processing then proceeds to step S216.

In step S215, the CPU 101 determines whether the touch on the SW2 button 313 has been released. If it is determined that the touch on the SW2 button 313 has been released (YES in step S215), the processing proceeds to step S216. If it is determined that the touch on the SW2 button 313 has not been released (NO in step S215), the processing proceeds to step S217.

In step S216, the CPU 101 transmits an imaging stop command to the imaging apparatus 2, and the processing then proceeds to step S217.

In step S217, the CPU 101 determines whether the SW1 button 314 has been released. If it is determined that the SW1 button 314 has been released (YES in step S217), the processing proceeds to step S218. If it is determined that the SW1 button 314 has not been released (NO in step S217), the processing returns to step S201, and a user operation is determined.

In step S218, the CPU 101 transmits an imaging preparation stop command to the imaging apparatus 2, the processing returns to step S201, and a user operation is determined.

In the present exemplary embodiment, when the SW1 button and the SW2 button overlap, the SW1 button is returned to its original position in step S205. However, the processing may also be configured so that the display position of the SW1 button is not returned to its original position, and is displayed in a state overlapping the SW2 button until the touch on the SW2 button is released. Further, when moving the SW2 button to the lock area 316, the SW2 button may be displayed or moved with the SW1 button overlapping the SW2 button until the lock is released or until the SW2 button is released. Thus, by displaying the SW1 button and the SW2 button in an overlapping state until the touch is released or the lock is released, the user can grasp what instructions have been made by a touch operation up until that point.

A third exemplary embodiment will now be described.

The display control apparatus 100 according to the first exemplary embodiment includes an operation/display screen for remote imaging like that illustrated in FIG. 4. However, the display control apparatus 100 according to the present exemplary embodiment includes a plurality of operation/display screens. By performing a display mode switching operation on the operation/display screen, the photographer can switch between an operation/display screen (FIG. 4) like that in the first exemplary embodiment and a display screen for imaging like that in FIG. 8. Further, the operation/display screen like that in the second exemplary embodiment may also be configured so that it can be switched.

The display screen of the display control apparatus 100 during remote imaging applied in the present exemplary embodiment will be described with reference to FIG. 8. Parts having the same role as in the first exemplary embodiment are denoted with the same reference numeral, and a description thereof will be omitted.

Figure 8A:
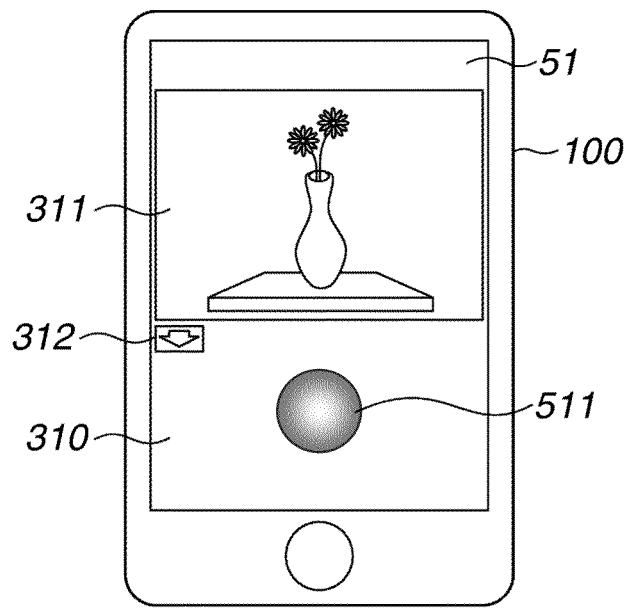
FIGS. 8A and 8B illustrate display examples in a display control apparatus 100.

FIG. 8A illustrates an operation/display screen according to the present exemplary embodiment, on which only a release button 511 is displayed instead of the SW1 button 314 and the SW2 button 313 according to the first exemplary embodiment.

On the operation/display screen illustrated in FIG. 8A, an imaging preparation operation instruction can be issued by touching the release button 511, and an imaging operation instruction can be issued by releasing the touch on the release button 511. When the CPU 101 detects that the release button 511 has been touched, the CPU 101 transmits an imaging preparation start instruction to the imaging apparatus 2. When the CPU 101 detects that the touch on the release button 511 has been released, the CPU 101 transmits an imaging start instruction (capture one image) to the imaging apparatus 2. Thus the instructions are realized.

The processing may also be configured such that the imaging preparation operation and the imaging operation on the imaging apparatus 2 are collectively performed based on the touch on the release button 511.

Normally, there is one release switch. Consequently, since the configuration illustrated in FIG. 8A may have better operability for the photographer, in the present exemplary embodiment, such an operation/display screen is prepared that enables switching based on a user setting.

Figure 8B:
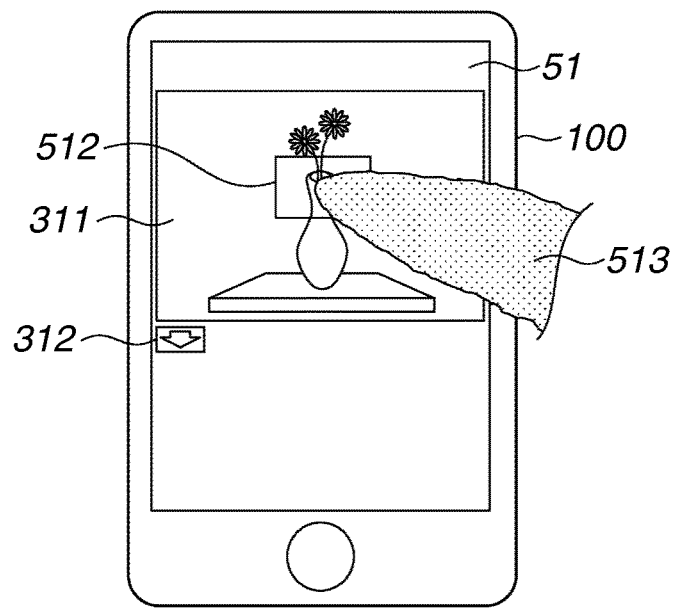

Further, the operation/display screen may also be configured in the manner illustrated in FIG. 8B. In FIG. 8B, by touching the live view display screen 311, an instruction can be issued to perform an imaging preparation operation that matches the position corresponding to the touched position. Further, an instruction can be issued to perform the imaging operation by releasing the touch on the live view display screen 311.

When the CPU 101 detects a touch on the live view display screen 311, the CPU 101 transmits information about the position on the live view screen corresponding to the touched position and an imaging preparation start command to the imaging apparatus 2. Further, the CPU 101 displays a frame 512 on the touched position, and notifies the photographer of an area that will serve as a reference for imaging preparation. When the touch is detected as having been released, the CPU 101 transmits an imaging command to the imaging apparatus 2.

Thus, by preparing a plurality of operation/display screens, and enabling switching based on an operation made by the photographer, a display control apparatus can be provided that has even higher userability.

Other Embodiments

The present invention is described based on the exemplary embodiments. However, the present invention is not limited to the specific exemplary embodiments. Various embodiments without departing from the scope of the invention are embraced by the present invention. Parts of the above described exemplary embodiments of the present invention may be appropriately combined.

In the above-described exemplary embodiments, although a case was described in which the present invention is realized in a remote imaging system configured from the imaging apparatus 2 and the display control apparatus 100, the system configuration is not limited to this. The system may be configured from many more apparatuses. Further, the present invention is not limited to a remote imaging system, the present invention may be applied in an imaging system that includes a touch panel display. In this case, the CPU in the imaging apparatus realizes the flowcharts illustrated in FIGS. 6 and 7 by controlling each unit in the imaging apparatus. Further, in the flowcharts, the processing may also be configured so that the remote live view display performs a normal live view display, and the CPU in the imaging apparatus controls the imaging operation and the imaging preparation operation in the imaging apparatus by transmitting the various commands to the timing generator 32 or the IC 33.

Further, in the above-described exemplary embodiments, although SW1 and SW2 were displayed as buttons, these may some other display item. Rather than buttons, a dedicated icon may be displayed, or a display object having a different shape may also be displayed.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-203018 filed Sep. 14, 2012, which is hereby incorporated by reference herein in its entirety.

What is claimed is:

1. An imaging control apparatus configured to control imaging of an image by an imaging unit, the imaging control apparatus comprising:
    a display control unit configured to display a first display item and a second display item on a display screen of a display unit;
    a detection unit configured to detect a touch operation on the display screen;
    an imaging preparation control unit configured to, in response to detection of a touch on the first display item, perform control to execute an imaging preparation operation for adjusting a specific imaging setting relating to capturing; and
    an imaging control unit configured to, in response to detection of a touch on the second display item, perform control to execute an imaging operation for capturing an image and recording the captured image,
    wherein the second display item can be moved according to a touch position detected by the detection unit, and
    wherein if the second display item has moved to a predetermined position, the imaging control unit is configured to perform control to cause the imaging unit to execute a continuous imaging operation even if the touch on the second display item has been released.

2. The imaging control apparatus according to claim 1, wherein after the touch on the second display item has been released, when executing a continuous imaging operation, the imaging control unit is configured to, according to a predetermined touch operation on the second display item, end the imaging operation.

3. The imaging control apparatus according to claim 2, wherein the predetermined touch operation is an operation of touching the second display item again after a touch on the second display item has been released.

4. An imaging control apparatus configured to control imaging of an image by an imaging unit, the imaging control apparatus comprising:
    a live view obtaining unit configured to periodically obtain a live view image from the imaging unit;
    a display control unit configured to display the live view image obtained by the live view obtaining unit, a first display item and a second display item on a display screen of a display unit;
    a detection unit configured to detect a touch operation on the display screen;
    an imaging preparation control unit configured to, in response to detection of a touch on the first display item, perform control to execute an imaging preparation operation for adjusting a specific imaging setting relating to capturing;
    an imaging control unit configured to, in response to detection of a touch on the second display item, perform control to execute an imaging operation for capturing an image and recording the captured image; and
    an enlargement display unit configured to enlarge a display area of the live view image,
    wherein if the display area of the live view image has been enlarged by the enlargement display unit, the display control unit is configured to change a display position of the first display item and the second display item.

5. The imaging control apparatus according to claim 4, wherein the first display item can be moved according to a touch position detected by the detection unit, and wherein if the first display item and the second display item overlap, the imaging control unit is configured to perform control to execute the imaging operation.

6. The imaging control apparatus according to claim 5, wherein if the first display item is moved to a predetermined position that overlaps the second display item, the imaging control unit is configured to perform control to execute the imaging operation.

7. The imaging control apparatus according to claim 6, wherein the predetermined position that overlaps the second display item is a position where either the first display item or the second display item is included within a display area of the other item.

8. The imaging control apparatus according to claim 6, wherein the predetermined position that overlaps the second display item is a position where a part of the first display item overlaps the second display item.

9. The imaging control apparatus according to claim 4, wherein the imaging control unit is configured to, while the second display item is touched, perform control to execute a continuous imaging operation.

10. The imaging control apparatus according to claim 4, wherein the imaging control apparatus comprises the imaging unit.

11. The imaging control apparatus according to claim 4, wherein the imaging unit is an external imaging apparatus that is different from the imaging control apparatus,
    wherein the imaging preparation control unit is configured to, in response to detection of a touch on the first display item, transmit to the imaging apparatus an imaging preparation command for causing the imaging apparatus to execute the imaging preparation operation, and
    wherein the imaging control unit is configured to, in response to detection of a touch on the second display item, transmit to the imaging apparatus an imaging command for causing the imaging apparatus to execute the imaging operation.

12. The imaging control apparatus according to claim 4, wherein the imaging control apparatus includes: a first display mode in which the imaging preparation operation and the imaging operation are executed based on a touch operation on the first display item and the second display item; and
    a third display mode in which the imaging preparation operation and the imaging operation are executed based on a touch operation on the live view image.

13. A method for controlling an imaging control apparatus configured to control imaging of an image by an imaging unit, method comprising:
    displaying a first display item and a second display item on a display screen of a display unit;
    detecting a touch operation on the display screen;
    performing, in response to detection of a touch on the first display item, control to execute an imaging preparation operation for adjusting a specific imaging setting relating to capturing; and
    performing, in response to detection of a touch on the second display item, control to execute an imaging operation for capturing an image and recording the captured image,
    wherein the second display item can be moved according to a touch position detected, and
    wherein if the second display item has moved to a predetermined position, performing control to cause the imaging unit to execute a continuous imaging operation even if the touch on the second display item has been released.

14. A non-transitory computer-readable storage medium storing a program for causing a computer to execute the method for controlling an imaging apparatus according to claim 13.

15. A method for controlling an imaging control apparatus configured to control imaging of an image by an imaging unit, the method comprising:
- obtaining a live view image from the imaging unit;
- displaying the live view image obtained, a first display item and a second display item on a display screen of a display unit;
- detecting a touch operation on the display screen;
- performing, in response to detection of a touch on the first display item, control to execute an imaging preparation operation for adjusting a specific imaging setting relating to capturing;
- performing, in response to detection of a touch on the second display item, control to execute an imaging operation for capturing an image and recording the captured image; and
- enlarging a display area of the live view image,
- wherein if the display area of the live view image has been enlarged, the display control unit is configured to change a display position of the first display item and the second display item.

16. A non-transitory computer-readable storage medium storing a program for causing a computer to execute the method for controlling an imaging apparatus according to claim 15.

* * * * *